Dec. 25, 1956  E. M. PURCELL  2,775,737
STANDING WAVE MEASURING SYSTEM
Filed May 3, 1946
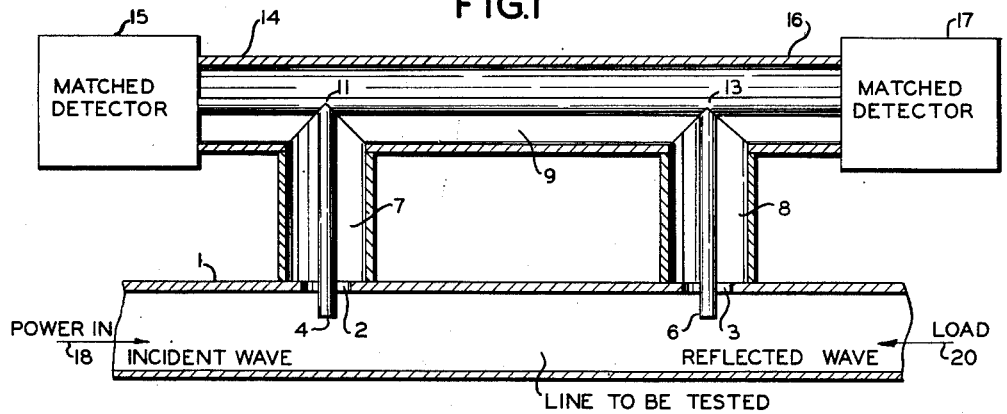
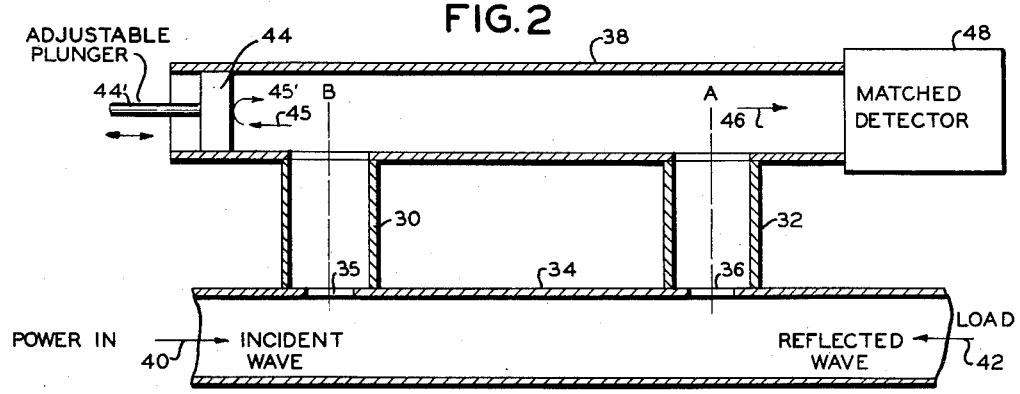
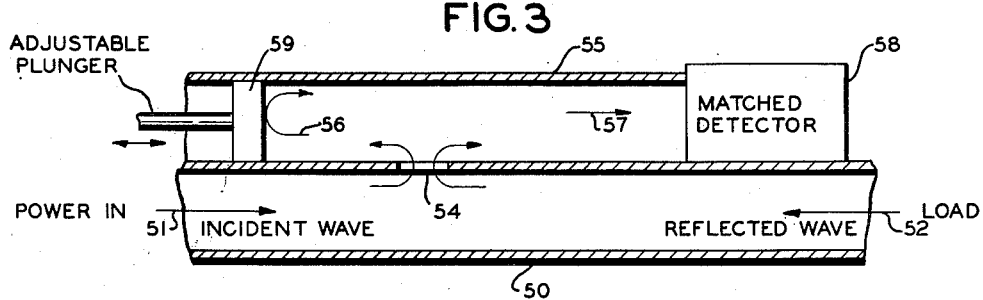
INVENTOR
EDWARD M. PURCELL
BY
*M. A. Hayes*
ATTORNEY United States Patent Office 2,775,737
Patented Dec. 25, 1956

2,775,737

STANDING WAVE MEASURING SYSTEM

Edward M. Purcell, Cambridge, Mass., assignor, by mesne assignments, to the United States of America as represented by the Secretary of the Navy Application May 3, 1946, Serial No. 667,072

7 Claims. (Cl. 324—58)

This invention relates to apparatus for measuring the intensity and position of high frequency electro-magnetic standing waves in wave guides including transmission lines of the coaxial conductor type. The term wave guide will be used herein to denote both types unless distinguished.

When energy is being transmitted along a wave guide with or without a central coaxial conductor, any discontinuity in impedance in general produces reflections which combine with the transmitted wave to produce standing waves in such guide or coaxial transmission line. Such a condition is usually undesirable and therefore it is important to have a convenient method of determining the magnitude of such standing waves so that apparatus can be adjusted or manufactured so as to minimize them. An earlier form of standing wave detector involved sliding a probe along a longitudinal slit in a wave guide or transmission line for abstracting energy therefrom, the ratio of the maximum amount to the minimum amount so measured at different points being the value of the standing wave ratio. A later apparatus is fully described in the patent application of Willard H. Fenn, Serial No. 571,319, filed January 4, 1945, now U. S. Patent No. 2,566,020 of August 28, 1951. In this method two stationary probes are inserted into a wave guide or transmission line through apertures provided in the wall thereof and auxiliary transmission lines or wave guides carry the energy picked up by these probes through two separate different paths to a common point in an auxiliary section of wave guide or transmission line, these paths being constructed of particular electrical lengths such that the energy from a wave traveling in one direction along the guide being tested will reenforce at a critical point in the auxiliary line while energy picked up by the two probes from the reflected wave returning along the guide from the opposite direction will be out of phase and cancelled at this critical point. A detecting device energized by a pick-up at the critical point would then give indication of the magnitude of the wave traveling in one direction only. In order to get the standing wave ratio the device must then be reversed in its position on the guide being tested so as to give an indication of the magnitude of the wave traveling in the opposite direction along the guide. From the ratio of these two magnitudes one can compute the standing wave ratio. In an alternative form of the Fenn invention two such critical points were provided one for the incident wave and one for the reflected wave and likewise two detectors thus eliminating the necessity of reversing the device.

Whereas the Fenn type apparatus employed two detecting devices in the auxiliary guide, or in the form employing only one detector required the auxiliary guide to be reversed in position on the wave guide under test, apparatus constructed in accordance with the present invention requires only one detector device and does not have to be reversed in order to make a complete determination of the standing wave ratio. In place of one of the detectors an adjustable plunger is provided, and as the plunger position is changed the relative phases of the picked up energy from the transmitted wave and the reflected wave will also change so that a maximum value and a minimum value resulting from their interference will be indicated on the single detector which will yield the standing wave ratio and this will be the standing wave ratio in the system being tested as well as in the test wave guide inserted into the system. Moreover the position of the adjustable plunger at which the minimum or maximum reading is obtained has a direct relation to the position of the standing wave in the wave guide interposed in the system under test, and hence, when suitably calibrated, will give a direct reading of the phase of the reflected wave system under test and of the phase of the standing wave pattern.

It is therefore the principal object of this invention to provide an apparatus by which the standing wave ratio in a wave guide or coaxial conductor transmission line may be determined by direct readings from a detector device without necessity of removing the device and reversing its position on the wave guide and without the necessity of using two detecting devices.

It is another object of this invention to provide a standing wave ratio measuring device requiring the use of one detector only which by manipulation of an adjustable short circuiting plunger will give two readings from which may be readily computed the standing wave ratio in the wave guide or coaxial line under test.

It is another object to provide an apparatus by which the relative phase of the transmitted and reflected wave in a wave guide or a transmission line may be determined, and hence by which the relative phase of a standing wave therein may also be determined. Other objects, features and uses of this invention will be found in the following detailed description when taken with the drawings, the figures of which are designed for purposes of illustration and are not to be considered as defining or limiting the scope of the invention.

Fig. 1 schematically illustrates a device heretofore used for standing wave measurement as described in the application of Fenn above referred to. Figs. 2 and 3 are schematic illustrations, of the construction and use of the present invention. Referring now to Fig. 1, a wave guide 1 is shown provided with openings 2 and 3. Probes 4 and 6, forming the ends of the central conductors of two branch coaxial lines 7 and 8 respectively, are inserted in the openings 2 and 3. The line sections 7 and 8 connect with an auxiliary coaxial line section 9, at points 11 and 13 respectively. Point 11 is connected by means of a line section 14 to a detector device 15 while the point 13 is connected by means of another line section 16 to a second detecting device 17.

This device is symmetrical and in one embodiment thereof the electrical length of the sections 7 and 8 was made equal to $$\frac{\lambda}{2}$$

and the electrical length between the probes 4 and 6, and between the points 11 and 13 was made equal to $$\frac{3\lambda}{4}$$

The characteristic impedances of the sections 7 and 8 should be equal. Characteristic impedances of the sections 14 and 16 are equal and equal to the characteristic impedance of the section 9. The detecting devices 15 and 17 should have impedances matched to the sections 14 and 16 respectively. An arrow 18 representing a high frequency electric wave which may be referred to as the incident wave traveling toward the right in the line 1 while another arrow 20 represents a high frequency electric wave which may be called the reflected wave traveling in the opposite direction along the line. If the two probes 4 and 6 each take some energy from the line, energy picked up by the probe 4 from a wave traveling in the direction of the arrow 18 will pass through the line sections 7 and 9 to reach the point 13, but energy from the same wave will also reach the same point 13 by continuing farther along the line 1 to the probe 6 and then passing along the line section 8. There will thus be two waves reaching the point 13 which have traversed two different paths. In the same manner, some energy from the wave traveling in the direction of the arrow 20 will pass directly along the line section 8 from the probe 6 to the point 13, and some will travel along the line 1 to the probe 4 and then to the point 13 through the line section 9. By providing an electrical distance between the line 1 and the two critical points 11 and 13 equal electrically to one-half wave length proper impedance matching was obtained. By providing a separation between the two probes 4 and 6 and between the two critical points 11 and 13 equal to an odd number of quarter-wave lengths, the two waves produced by the wave traveling in the direction of the arrow 18 are caused to be in phase when they reach the point 13, so that they will add together in the detector device 17. However, the two waves produced by the wave traveling in the direction of the arrow 20 are caused to be 180° out of phase and equal in amplitude when they reach the point 13, so that they cancel out and produce no effect on the detecting device 17.

The detector 15 will measure the wave 20 traveling to the left but will be unaffected by wave 18 traveling towards the right. The detector 17 on the other hand will measure the wave 18 traveling toward the right, but will be unaffected by wave 20 traveling towards the left. Thus this device distinguishes between electro-magnetic waves flowing in opposite directions along the transmission line 1 and provides a means by which the energy in these waves may be separately measured. By applying the apparatus at a fixed position on a transmission line therefore the standing wave ratio may be obtained without moving the apparatus along the line. In another embodiment of Fenn's invention as described in his patent application, one of the detecting devices may be omitted, and the other detector energized by a pickup at one critical point similar in effect to 11 or to 13 for example so that the device will then be sensitive to a wave traveling in one direction only. With such an apparatus, however, in order to obtain the measure of the wave traveling in the opposite direction the device must be removed from the line being tested and reversed in its position thereupon.

Fig. 2 shows the arrangement of apparatus adapted for measuring standing waves in accordance with this invention which requires one detector only, and does not need to be reversed in order to obtain the standing wave measurement. Branch wave guides 30 and 32 are shown coupled to a wave guide 34 (to be tested) through suitable apertures 35 and 36, the size of which controls the amount of coupling. The centers of the holes should be spaced by an electrical distance of an odd number of quarter wave lengths within the guide, and the branch wave guides 30 and 32 should have an electrical length equivalent to one-half wave length, and lead into a test wave guide 38 parallel to the wave guide 34 being tested. An arrow 40 indicates energy traveling toward the right in the system to be tested, which may be called the incident wave. An arrow 42 indicates the energy traveling in the opposite direction in the system to be tested and may be referred to as the reflected wave. In accordance with the principles above set forth, energy from the incident wave 40 following the two separate paths will be in phase at point A and hence additive, but will be out of phase from the two paths at point B and hence will cancel. Similarly energy from the reflected wave 42 will reach the point B through the two paths in phase and be additive but will cancel at A. There will thus result in the test guide 38 one wave traveling to the right and another wave traveling to the left, having the same relative intensities as the corresponding waves in the wave guide in the system under test. In one arm of the test guide 38 there is provided an adjustable short circuiting plunger 44 moved by a member 44'. This plunger 44 will reflect the induced wave indicated by arrow 45 traveling to the left in the test guide 38 from the point B and cause it to move to the right as indicated by arrow 45' so that it interferes with the induced wave 46 also traveling to the right. On the other arm of the test guide 38 a detecting device 48 is provided properly matched to the test guide 38 which measures a resultant traveling wave which is the vector sum of the two waves 45' and 46 in the test guide. As the adjustable plunger 44 is moved in or out, the relative phase of the interfering waves 45' and 46 is changed, and the indication of the detector will pass through maximum and minimum values. The ratio of the maximum to the minimum values so indicated will be the standing wave ratio in the test guide 38 and hence also of the standing wave ratio in the guide 34 being tested by the device.

The position of the adjustable plunger 44 at which the maximum or the minimum reading is obtained will have a direct relation to the position of the standing wave in the test guide and in the system under test, and hence may be suitably calibrated to give a direct reading of the phase of the reflected wave in the system under test and of the phase of the standing wave pattern. While the embodiment shown in Fig. 2 is composed of wave guides not having a central conductor, the electrical principles involved are identical and may be applied in apparatus having coaxial conductor sections. Furthermore, either type of apparatus may be used to test a system having coaxial conductors or a system having wave guides.

Fig. 3 shows another application of the principles of this invention. There is shown a wave guide 50 of a system to be tested with an incident wave indicated by arrow 51 and a reflected wave indicated by arrow 52 traveling in opposite directions. A coupling aperture 54 is provided in the middle of the wide wall of the rectangular wave guide, directly into an associated test wave guide 55. It has previously been discovered that a coupling aperture of this type has directional properties and that corresponding to the incident wave 51 there will be a wave in the adjacent guide traveling in the opposite direction, indicated by arrow 56. Similarly corresponding to the reflected wave 52 there will be its corresponding wave in the associated test guide 55 traveling in the opposite direction indicated by arrow 57. In this case then therefore, if a matched detecting device 58 is placed at one end of the associated test guide 55 and an adjustable plunger 59 at the other the standing wave ratio in the test guide 55 and hence of the guide 50 in the system being tested may be determined by moving the plunger 59 in and out to obtain maximum and minimum readings, the ratio of the maximum to the minimum reading giving the standing wave ratio in the case as it did in the embodiment shown in Fig. 2. While particular and specific embodiments of the invention have been shown, the principles of using matched detecting and coupling devices together with means for reversing directions and varying the relative phases of waves traveling in opposite directions may be used in many other applications and hence this invention is not to be deemed limited except as made necessary by the prior art and the spirit of the appended claims.

I claim:

1. An apparatus for measuring the ratio of the relative magnitudes of high frequency electro-magnetic waves travelling in opposite directions along a wave guide, comprising a pair of energy extracting means adapted to be connected to said guide at two points which are separated from each other along said guide by an electrical distance equal to an odd number of quarter wave lengths within the guide, an auxiliary section of wave guide, a detecting and measuring device placed at one end of said auxiliary section and matched thereto, a short circuiting means inserted at the other end of said auxiliary section having its position with reference to said auxiliary section longitudinally adjustable, means for adjusting the position of said short circuiting means and electrical connections having an electrical length equal to one-half wave length of the energy being propagated therein between each of said energy extracting means and to respective points on said auxiliary section separated by the same electrical distance as the said two points first named.

2. An apparatus for measuring the magnitude and phase of standing waves in a wave guide, comprising a pair of substantially parallel branch wave guides adapted to be coupled to said wave guide to be tested at points separated by a distance substantially of an odd number of quarter wave lengths, an auxiliary test wave guide disposed substantially parallel to said first named wave guide and connected to said branch guides, a detecting and measuring device positioned at one end of said auxiliary wave guide section and matched in impedance thereto, a movable short circuiting means positioned within the other end of said auxiliary wave guide section whose longitudinal position with respect said branch wave guides is adjustable, and means for adjusting the longitudinal position of said short circuiting means.

3. The method for measuring the standing wave ratio in a wave guide, of separating the standing wave into the incident wave and the reflected wave which together are the components of said standing wave, reversing the direction of travel of one of the components, combining the two components again so that both are travelling in the same direction, adjusting the relative phases of the said recombined components so that by their interference with each other a maximum amplitude travelling wave is produced, adjusting the relative phases of the recombined components so that a minimum amplitude travelling wave is produced, and measuring the amplitudes of said maximum and minimum travelling waves.

4. Apparatus for measuring the magnitude and phase of standing waves in a wave guide comprising, a main wave guide for propagating electromagnetic energy, a pair of substantially parallel branch wave guides, means for coupling energy into said branch wave guides from said main wave guide at points spaced an odd number of quarter wave lengths, an auxiliary wave guide disposed parallel to said main wave guide coupled to said branch wave guides, a detecting and measuring device positioned at one end of said auxiliary wave guide and matched in impedance thereto, and an adjustable phase shifting plunger positioned at the other end of said auxiliary wave guide.

5. Apparatus for transmission line standing wave measurement comprising, a wave guide section, a detecting and measuring device positioned at one end of said wave guide section, a directional coupling device connected between said wave guide section and said transmission line for coupling a portion of the incident and reflected wave energy from said transmission line to said wave guide section in opposite directions, and phase shifting means positioned at the other end of said wave guide section for adjusting the relative phase of the waves transferred to said wave guide section from the incident wave and the reflected wave in said transmission line.

6. Apparatus for transmission line standing wave measurement comprising, a main rectangular wave guide for propagating energy in the form of ultra high frequency electromagnetic waves, an auxiliary wave guide section disposed substantially parallel to said main wave guide section, a detecting and measuring device positioned at one end of said auxiliary wave guide section, a directional coupling device positioned in the broad wall of said main rectangular wave guide communicating with said auxiliary wave guide section and adapted to couple a portion of the incident and reflected wave energy from said main wave guide to said auxiliary wave guide section in opposite directions of propagation, and an adjustable phase shifting device positioned at the other end of said auxiliary wave guide section for adjusting the relative phase of the waves induced in said auxiliary wave guide section from the incident wave and the reflected wave in said main wave guide section, whereby maximum and minimum values of the resultant wave in said auxiliary wave guide section indicate the standing wave ratio present in the main wave guide.

7. Apparatus for wave guide standing wave measurement comprising, a directional coupler having a main wave guide section, an auxiliary wave guide section disposed parallel to said main wave guide section, two identical coupling devices of equal electrical length spaced an odd number of quarter wave lengths apart and providing communication between said wave guide sections, a detecting and measuring device positioned at one end of said auxiliary wave guide section and an adjustable phase shifting device positioned at the other end of said auxiliary wave guide section whereby adjustment of said phase shifting device produces a maximum and a minimum value of the resultant wave induced from the incident wave and the reflected wave travelling in said main wave guide.

References Cited in the file of this patent

UNITED STATES PATENTS

| | | |
|---|---|---|
| 2,106,713 | Bowen | Feb. 1, 1938 |
| 2,232,179 | King | Feb. 18, 1941 |
| 2,375,223 | Hansen | May 8, 1945 |
| 2,403,289 | Korman | July 2, 1946 |
| 2,412,393 | Ghosh | Dec. 10, 1946 |
| 2,423,390 | Korman | July 1, 1947 |
| 2,445,348 | Ford | July 20, 1948 |
| 2,522,563 | Blitz | Sept. 19, 1950 |

FOREIGN PATENTS

| | | |
|---|---|---|
| 545,936 | Great Britain | June 18, 1942 |